March 14, 1950     C. P. HOOD     2,500,251
CUT FILM MAGAZINE

Filed July 3, 1947     6 Sheets-Sheet 1

C. P. Hood
INVENTOR

BY C. A. Snow & Co.
ATTORNEYS.

March 14, 1950 C. P. HOOD 2,500,251
CUT FILM MAGAZINE
Filed July 3, 1947 6 Sheets-Sheet 2

C. P. Hood
INVENTOR
BY *Snow&Co.*
ATTORNEYS.

March 14, 1950 C. P. HOOD 2,500,251
CUT FILM MAGAZINE

Filed July 3, 1947 6 Sheets-Sheet 3

C.P.Hood
INVENTOR
BY CASnow&Co.
ATTORNEYS.

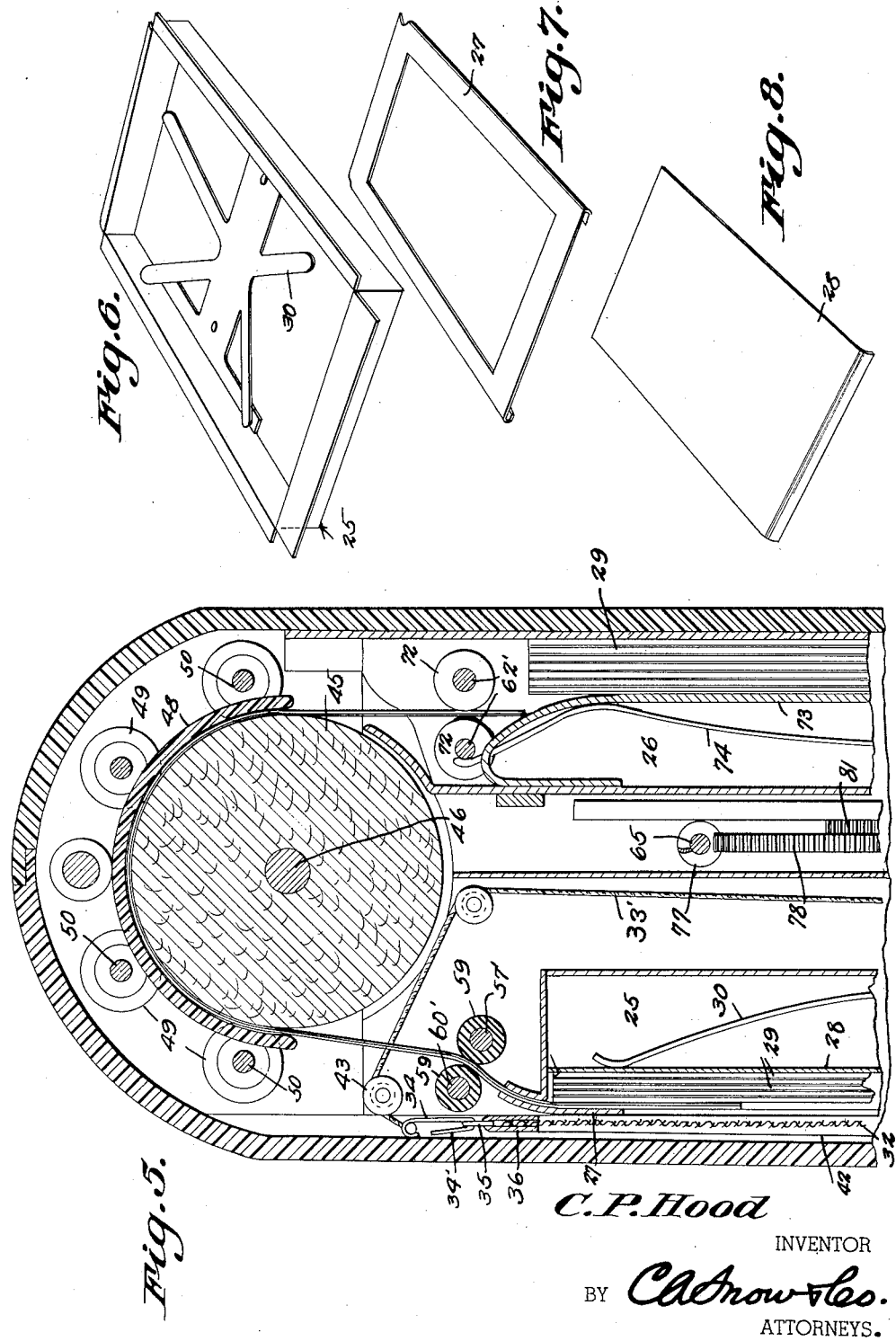

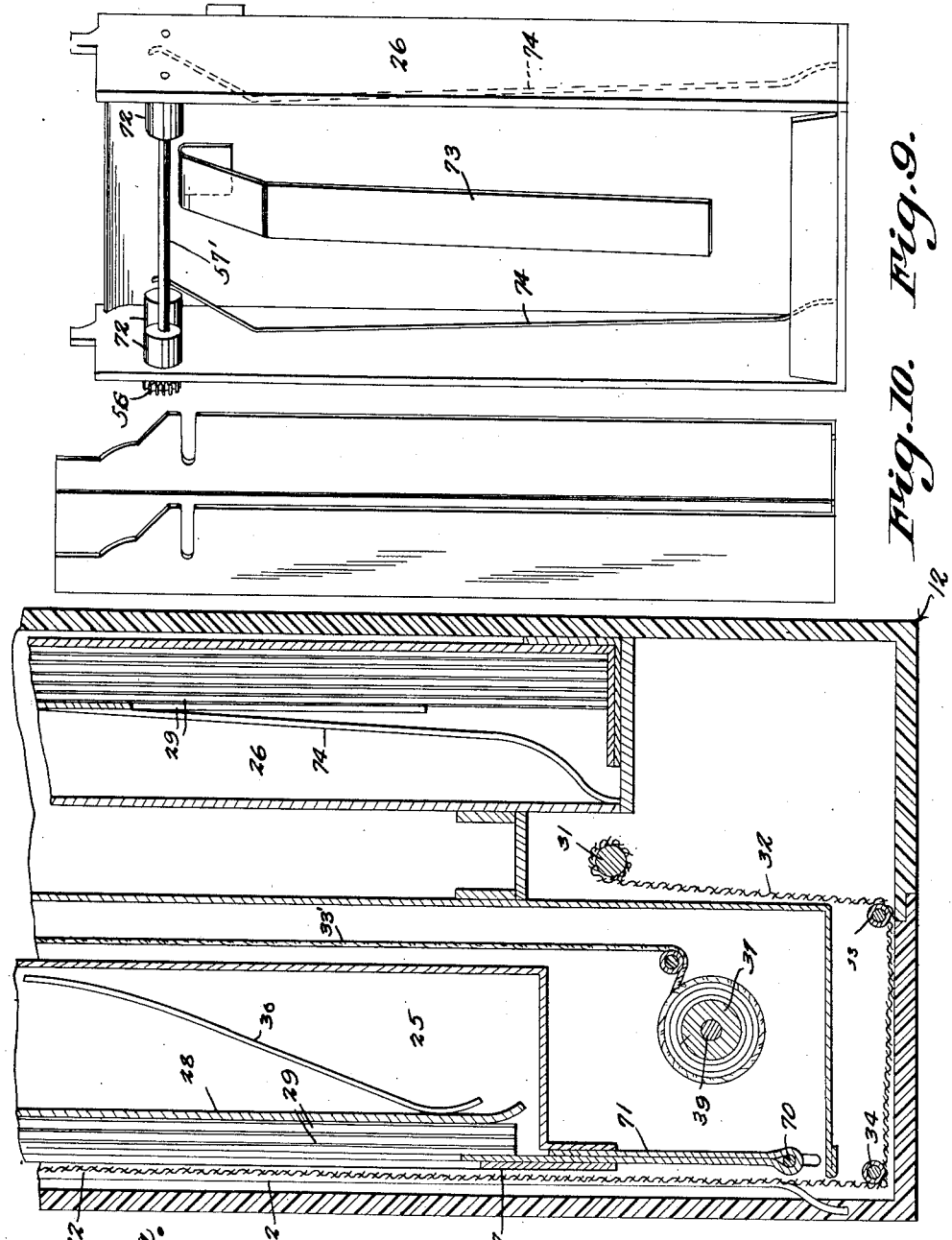

March 14, 1950  C. P. HOOD  2,500,251
CUT FILM MAGAZINE
Filed July 3, 1947  6 Sheets-Sheet 6
Fig. 11.
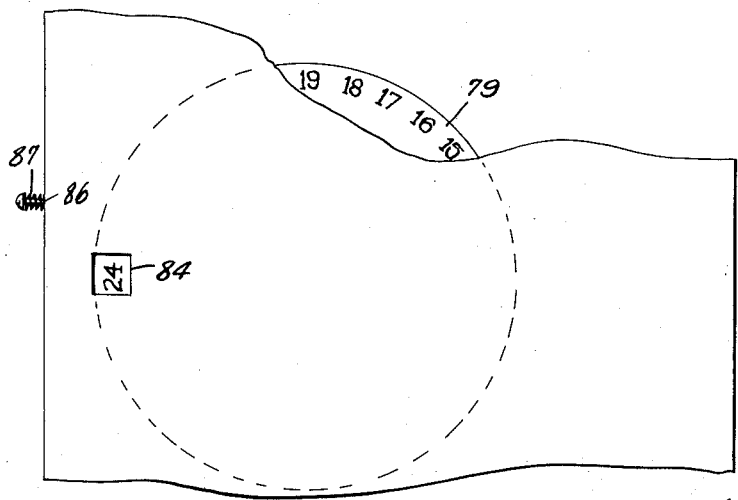
Fig. 12.
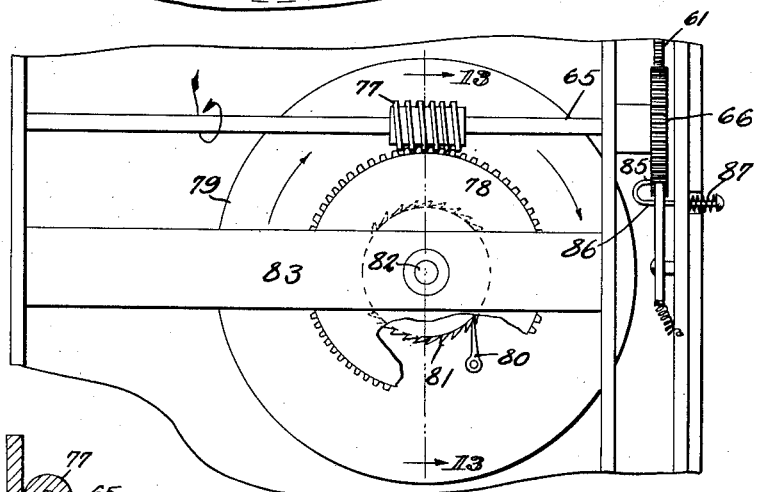
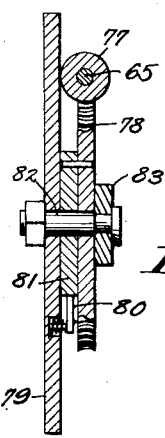
Fig. 13.
C. P. Hood
INVENTOR
BY C. A. Snow & Co.
ATTORNEYS.

Patented Mar. 14, 1950

2,500,251

UNITED STATES PATENT OFFICE 2,500,251

CUT FILM MAGAZINE

Charles P. Hood, Washington, D. C.

Application July 3, 1947, Serial No. 758,731

4 Claims. (Cl. 95—19)

This invention relates to an attachment for cameras in the form of an automatic multi-cut film adapter, to be used in the process of photography, and more specifically to be used on cameras specially designed for accommodating cut film in holders, plates in holders, and film packs.

The primary object of the invention is to provide means for placing a number of cut films successively in position to be exposed to light through a camera lens, and mechanical means for moving the exposed films from the exposure point of the camera, to a receptacle or receiving compartment at the rear of the camera, in which the exposed film will be protected from light rays, and from which receiving compartment the exposed film may be easily removed for chemical development, without disturbing the remaining sensitive unexposed film strips held within the attachment.

A further object of the invention is to arrange the film strips so that removal of an exposed film strip from the exposure area brings into position for exposure, the succeeding film, which operation may be repeated until all of the film strips placed in the unexposed film receiving compartment, have been successively and singly brought into position for exposure before the camera lens, the quantity of cut film placed in the receiving compartment being regulated by the size of the receiving compartment.

Still another object of the invention is to provide means for covering the exposure area of the film so that unexposed film within the attachment may be protected against fogging, due to exposure to light when the device is removed from the camera back or swung away from the camera for the purpose of focusing on a ground glass screen which is moved before the opening of the camera.

The invention further embodies an indicator for indicating the number of cut films remaining in the receiving compartment at any time.

A further important object of the invention is to provide a mounting at the back of a camera, which is so arranged that the device may be swung laterally through an arc of approximately 90 degrees, in order to clear the back of the camera so that a frame carrying a translucent focusing screen, forming an integral part of the mounting, may be swung into position for focusing the camera.

With the foregoing and other objects in view which will appear as the description proceeds, the invention consists of certain novel details of construction and combinations of parts, hereinafter more fully described and pointed out in the claims, it being understood that changes may be made in the construction and arrangement of parts, without departing from the spirit of the invention as claimed.

Referring to the drawings:

Figure 5 is a sectional view taken on line 5—5 of Figure 2.

Figure 5a is a sectional view taken on line 5a of Figure 2.

Figure 6 is a perspective view of the unexposed film receiving compartment.

Figure 7 is a perspective view of the slide cover frame for the unexposed film receiving compartment.

Figure 8 is a perspective view of the unexposed film strip follower plate, which operates within the unexposed film receiving compartment.

Figure 9 is a perspective view of the casing in which the film strips are held, after exposure.

Figure 10 is a perspective view of the cover therefor.

Figure 11 is a fragmental elevational view illustrating the indicating disc which is supplied with indicia indicating the number of films remaining within the pack.

Figure 12 is a rear elevational view illustrating the rear surface of the indicator.

Figure 13 is a sectional view taken on line 13—13 of Figure 12.

Figure 1:
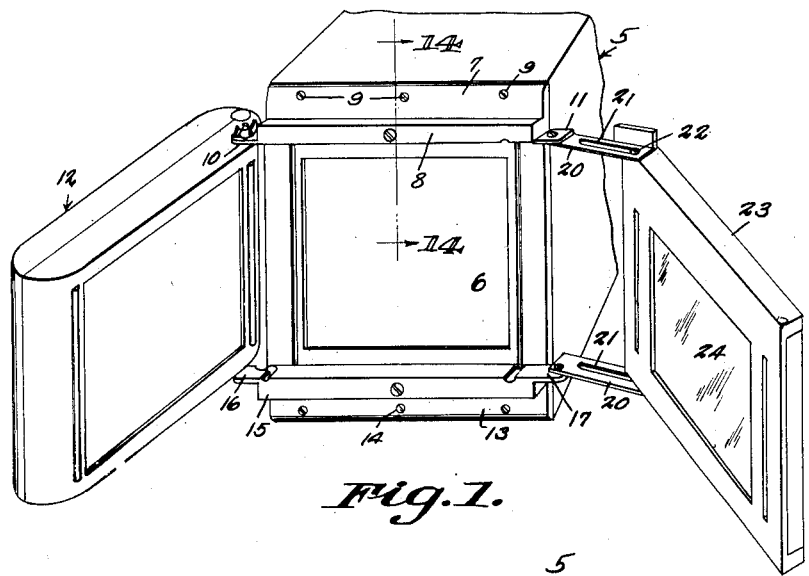
Figure 1 is a perspective view illustrating the rear end of a camera with a device constructed in accordance with the invention as attached thereto.
Figure 15:
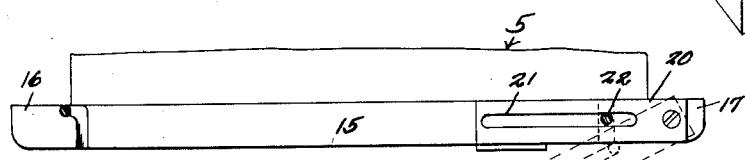
Figure 15 is an edge elevational view of the ground glass sight frame and hinge for supporting the ground glass sight frame, and plate holder.
Figures 14, 16, 17:
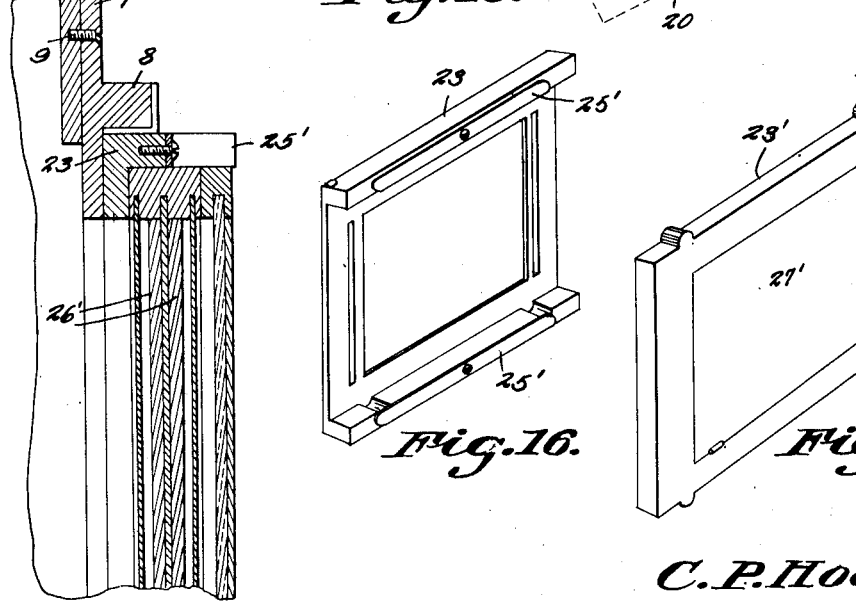
Figure 14 is a sectional view taken on line 14—14 of Figure 1, the plate holder being folded inwardly.
Figure 16 is a perspective view of one section of the frame.
Figure 17 is a perspective view of the movable section of the frame.

Referring to the drawings in detail, the reference character 5, Figure 1 of the drawings, indicates the rear section of a camera body, the reference character 6 indicating the film exposure opening of the conventional camera.

The device forming the subject matter of the present invention is in the form of an attachment which is mounted directly against the rear outer wall of the camera adjacent to the exposure opening 6, and includes the upper bar 7 which is formed with an outwardly extended rib 8, there being provided openings and screws 9 positioned within the openings for securing the upper bar 7 in position on the camera.

The ear 10 provides one side of the support for the film housing 12. The reference character 13 indicates a bar which is extended along the lower edge of the rear surface of the camera adjacent to the opening 6, the bar 13 being secured to the camera by means of the screws 14.

A rib indicated at 15 extends longitudinally of the bar 13 and is provided with ears 16 and 17 at its ends, the ear 16 cooperating with the ear 10 in supporting the film housing 12. The ear 17 provides the lower support for the frame 23, which is connected to the ears 11 and 17, by means of the links 20, the links 20 being provided with elongated openings 21 that accommodate the screws 22 that extend into the frame 23. These elongated openings permit the frame 23 to swing inwardly over the film housing 12, when the film housing has been swung inwardly over the opening 6 to a position to take pictures.

The frame 23 provides a support for the ground glass 24 which is used in focusing the camera, when the film housing is moved to the position as shown by Figure 1 of the drawings, and the frame 23 is moved inwardly over the opening 6.

The frame 23 also provides a support for sensitized plates 26' which are held within the frame by the movable section 23', the lugs 24' being held under the springs 25'.

A hinged cover 27' closes the opening in the movable section 23' to protect the sensitized plates held therein.

The attachment comprises a boxlike structure and includes the unexposed film compartment 25 and the compartment 26 in which the exposed films are delivered, after pictures have been taken.

A rectangular frame 27 is formed at the open side of the unexposed film compartment 25, against which the film strips are pressed, by means of the follower plate 28 that is moved forwardly towards the film strips, which in the present showing are indicated by the reference character 29, by means of the leaf spring 30.

Located adjacent to one end of the boxlike housing, is a spring roller 31 over which the dark curtain 32 is wound, the curtain 32 passing over rollers 33 and 34 disposed adjacent to one wall of the housing, from where the curtain moves upwardly directly in front of the foremost film strip which is contained within the film housing 25, the dark curtain being extended to its position over the film magazine 25, by means of the cables 33' that are formed with hooks 34' at their ends, which hooks are hooked into the eyes 35 that are carried by the bar 36 to which the free end of the dark curtain is secured.

Figure 2:
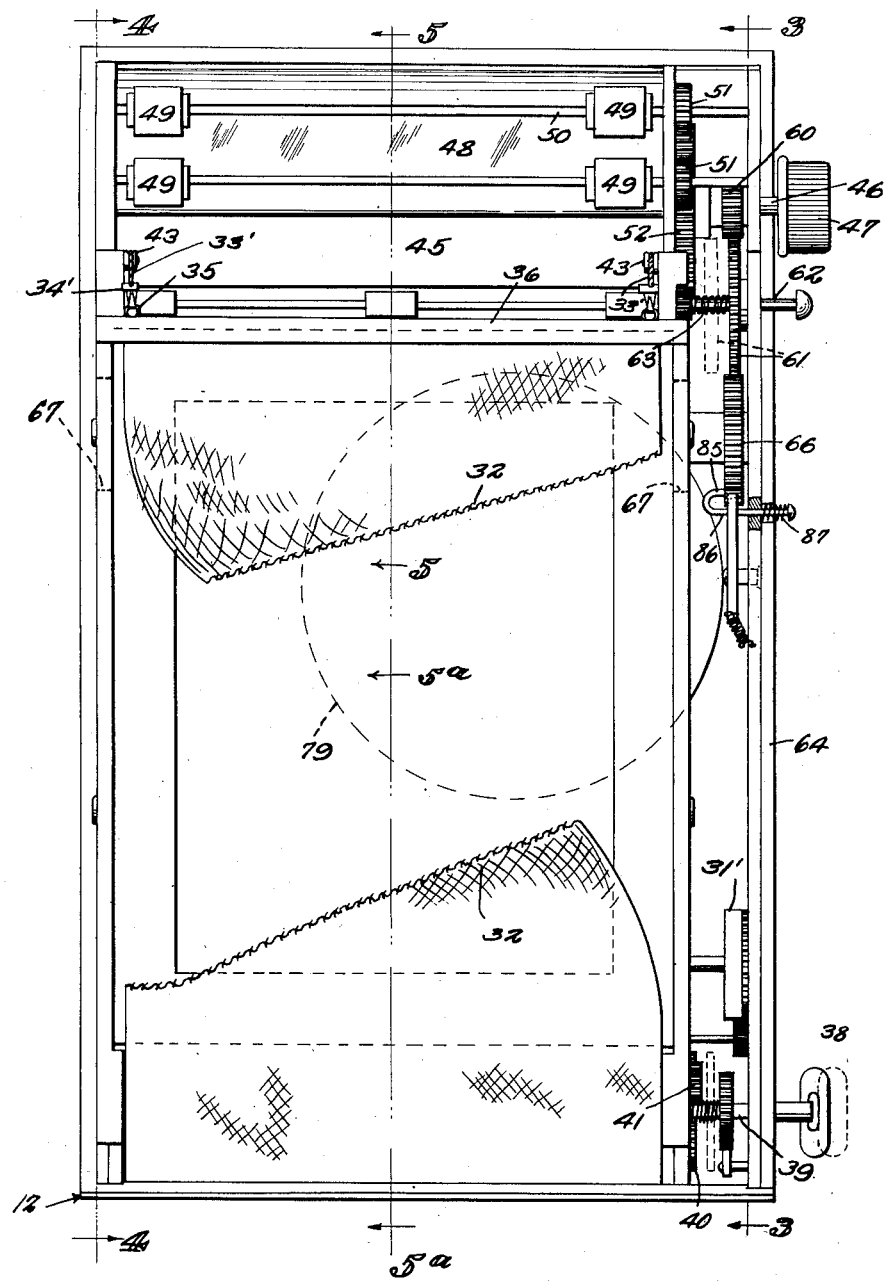
Figure 2 is an enlarged elevational view of the attachment, the cover of the attachment having been removed.
Figure 3:
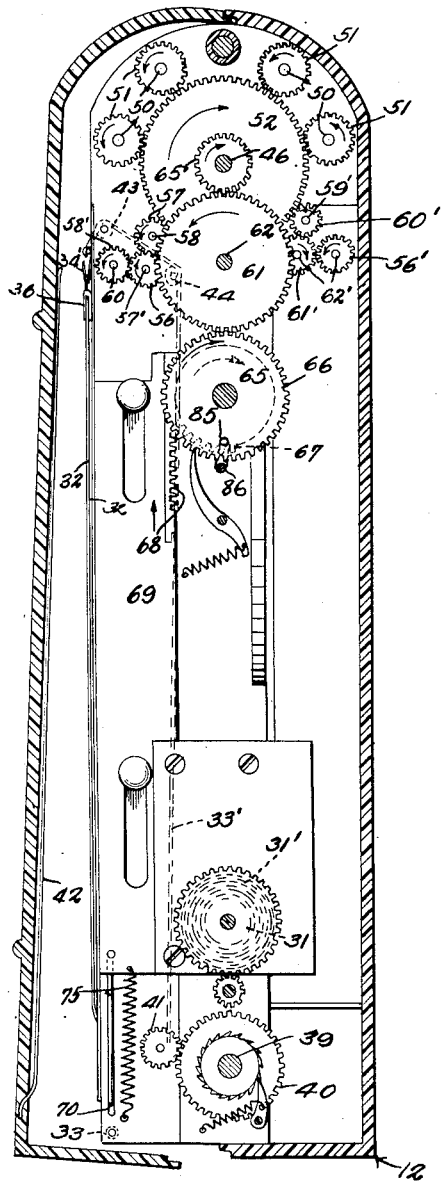
Figure 3 is a vertical sectional view taken on line 3—3 of Figure 2.
Figure 4:
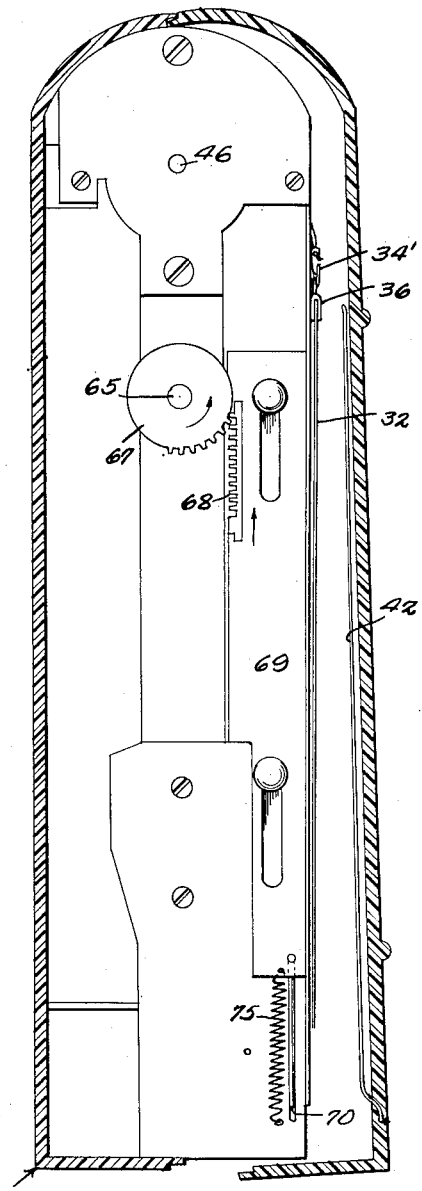
Figure 4 is a sectional view taken on line 4—4 of Figure 2.

These cables 33' are wound on the roller 37 mounted within the housing, and the roller 37 is rotated by means of the key 38 that is secured to one end of the shaft 39 by means of a splined connection, the splined connection including the gear 40 that meshes with the gear 41 in such a way that as the key 38 and shaft 39 are rotated in one direction, the cables 33' will be wound on the roller 37 causing the dark curtain to be extended to the position as shown by Figures 5 and 5a. As the curtain is being extended, it will, of course, be understood that the spring roller 31 will be wound to tension the spring. By pulling the key 38 to the dotted line position as shown by Figure 2 of the drawings, the holding action of the key 38 and gear 40 will be relieved, subjecting the roller 31 to the action of its tensioned spring 31', which will act to rewind the dark curtain on the roller 31, leaving the outer film strip of the magazine, exposed.

Spring members 42 extend along opposite sides of the exposure opening of the compartment 25, and provide a surface under which the bar 36 slides. It will be seen by Figure 5 of the drawings, that the cables 33' also operate over rollers 43 and 44 disposed within the housing, for guiding the cables to insure a direct pull by the cables, when the cables are operating to move the dark curtain to close the open side of the compartment 25.

At one end of the housing, is a substantially large roller 45 which is mounted on the shaft 46 which extends through the housing and is provided with a turning knob 47 on the end thereof, to permit the shaft and roller 45 to be rotated readily.

The reference character 48 indicates a curved guard which is spaced from the roller 45, providing a guide way for the film strip. The curved guard is provided with a plurality of openings disposed adjacent to the ends thereof, which openings accommodate the friction rolls 49 that contact with the film strips at their edges feeding the film strips from the compartment 25, to the compartment 26. Thus it will be obvious that the contact between the rolls 49 and film strips is at points remote from the picture area, eliminating any possibility of damaging the emulsion of the film strip. As shown by Figure 5 of the drawings, a film strip is shown as being moved from the compartment 25 to the compartment 26. The friction rolls 49 are mounted on the shafts 50 that extend longitudinally of the roller 45, the shafts being provided with pinions 51 that mesh with the substantially large pinion 52 secured to the shaft 46, so that as the shaft 46 is rotated in rotating the roller 45, the rolls 49 will also be rotated.

The pinion 52 meshes with idle pinion 57 mounted on one end of the shaft 58, the idle pinion 57 transmitting movement to the pinion 56 mounted on shaft 47, the pinion 56 being in mesh with pinion 58' mounted on the shaft 60. Thus, it will be seen that as the pinion 52 rotates, rotary movement is transmitted to the shafts 56 and 60, to rotate the friction rolls 49. At the opposite side of the casing is shaft 59' on which the idle pinion 60' operates, which pinion 60' meshes with pinion 61' that is geared to pinion 56'. These pinions 61' and 56' are mounted on the shafts 62' on which the rolls 72 are secured, so that rotary movement is transmitted to the friction rolls 72 for feeding the film strips into the compartment 26. Also secured to the shaft 46, is a pinion 65' which pinion 65' is in mesh with the pinion 61 mounted for sliding movement on the shaft 62, the pinion 61 being normally urged to its active position or to a position in mesh with the pinion 65', by means of the coiled spring 63.

Various shafts and pinions of the device are supported by means of the bar 64 which extends along one side of the housing in spaced relation therewith, the bar being provided with bearing openings for the reception of the shafts on which the various pinions are mounted, as clearly shown by Figure 2 of the drawings.

Extending transversely of the housing, is the shaft 65 to which the pinion 66 is secured, the pinion 66 being in mesh with the pinion 61 to receive motion therefrom. In other words, as the pinion 61 rotates, rotary movement will be transmitted to the shaft 65, through the pinion 66. Secured to the shaft 65, are mutilated gears 67 that rotate with the shaft 65, the mutilated gears 67 being designed to engage the racks 68 formed on the slide bars 69 that operate on opposite sides of the housing. These slide bars 69 at opposite sides of the housing, are connected by means of the rod 70 to which the ejector plate 71 is connected, the free edge of the ejector plate being so disposed that it will contact with one edge of the film strip to be moved from the exposure compartment, when it is desired to move an exposed film, to the compartment 26.

It will be seen that due to this construction, as the knurled finger piece on knob 47 is rotated to rotate the roller 45, the mutilated gears will also be rotated, and when the teeth of the mutilated gear mesh with the racks 68, the slide bars 69 will be moved longitudinally of the housing, the ejector plate moving therewith, to force the outermost film strip upwardly to a position between the friction members 59. Upon further rotation of the shaft 46, the exposed film strip will be moved around the roll 45, under the curved guard 48, where it will be directed between the friction rollers 72 mounted within the compartment 26, from where the film strip will be moved under the plate 73 which is held within the compartment 26, and pressed forwardly against the film strips, by means of the leaf spring 74. As the slide bars 69 move to cause the ejector plate to force a film from the compartment 25, the springs 75 that are connected with the bars 69 and have their opposite ends anchored to the housing, are placed under tension, with the result that as the teeth of the mutilated gears move out of contact with the rack bars 68, the slide bars 69 will be returned to their normal positions by means of the springs 75, whereupon the slide bars are again in position to operate the ejection plate 71 to engage the adjacent exposed film strip, to eject the same.

The shaft 65 on which the pinion 66 is secured, extends transversely of the housing, and to this shaft is secured the worm gear 77 which worm gear 77 meshes with the pinion 78 secured to the lower surface of the indicating disc 79 which is supplied with numbers corresponding to the numbers of the film strips held within the compartment 25. Rotary movement of the pinion 78 is directed to the disc 79 by means of the pawl 80 and ratchet 81, the ratchet being loosely mounted in the shaft 82 that is mounted in a bearing opening of the bar 83 extending through the housing, the pawl being carried by the disc 79.

The numbers on the disc 79 are so arranged that with each movement of a film strip from the compartment 25, the number will be moved before the sight opening 84 formed in one of the plates of the housing, so that the operator may at a glance, determine the number of films remaining in the compartment.

The pinion 66 is formed with an opening in the inner surface thereof which opening is designed to receive the end 85 of the lock pin 86 which pin is normally held in position so that the end 85 thereof rubs on the inner surface of the pinion 66, due to pressure exerted by means of the coiled spring 87. With each rotation of the pinion 66, the end 85 will be caused to engage within the opening of the pinion 66 restricting further movement of the pinion 66 and the shaft 65, on which it is mounted, thereby restricting rotary movement of the indicating disc 79 so that it will move to display one number before the display opening 84, with each movement of a film from the compartment 25. When the movement of the pinion 66 is locked by means of the pin 86, the shaft 62 is forced inwardly to disengage the pinions 60 and 61, whereupon the continued rotation of the shaft 46 and roller 45 will be permitted to complete the movement of the film to the exposed film compartment 26.

It will of course be understood that when it is desired to transfer another film from the compartment 25 to the compartment 26, the pin 86 will be moved inwardly against the tension of the spring 87 to free the pin of the opening in the pinion 66, permitting the shaft 46 to be operated.

It might be further stated that the attachment is mounted within a sectional casing which may be readily and easily opened to remove either compartment, and to make any necessary repairs in the structure.

In loading the adapter with unexposed cut film, the case is opened and the mechanism as a unit is withdrawn. The hooks 34' are now disconnected from the flexible curtain allowing the curtain to roll on its spring roller. The film compartment is removed and the film strips with their opaque paper backing attached, are positioned within the compartment.

After the adapter has been loaded, the dark curtain is operated to cause it to roll on its roller, leaving the first film in position for exposure. The picture is made by exposing the film in the usual and well-known manner.

It will also be noted that due to this construction, the dark curtain may be moved over the unexposed film in compartment 25, and the compartment 26 removed with its film, to develop these films in the usual way.

By this structure, any number of pictures up to the capacity of the compartment, may be removed, and developed without disturbing the unexposed films in the attachment. The device also provides novel means whereby a supply of films may be provided in the camera, eliminating the necessity of carrying heavy cases for films or plates, as now is required.

What is claimed is:

1. The combination with a camera, of a film strip adapter comprising a housing having an exposure opening, means for pivotally mounting the housing on a camera with the exposure opening in registry with the exposure opening of the camera for taking a picture, a compartment in which unexposed film strips are held, a film compartment for receiving exposed films, means for transferring exposed films successively from the unexposed film strip compartment to the compartment for exposed film strips, including a feed roller a curved guide plate spaced from the feed roller and providing a passageway with the feed roller through which the film strips are fed, said guide plate having openings, friction rolls extending through the openings engaging the film strip and cooperating with the feed roll for guiding and moving the individual film strips into the compartment for receiving exposed films, whereby said exposed film strips may be removed and developed independently of the unexposed film strips, and means for moving the film strips into engagement with the friction rolls.

2. The combination with a camera, of a film strip adapter comprising a housing having an exposure opening, means for pivotally mounting the housing on a camera with the exposure opening in registry with the exposure opening of the camera for taking a picture, a compartment in which unexposed film strips are contained, a feed roller disposed between the compartments for feeding film strips from the unexposed film strip compartment to the exposed film strip compartment, gears on the feed roller, friction rollers having gears meshing with the gears of the feed roller operating the friction rollers by the operation of the feed roller feeding exposed film strips to the feed roller, slide bars mounted on the housing, said slide bars having racks, gearing operated by the feed roller, said gearing including mutilated gears meshing with the racks for intermittently operating the slide bars, and means carried by the slide bars for engaging exposed film strips moving the exposed film strips to positions between the friction members for feeding through the housing.

3. A camera having an exposure opening, a film strip adapter including a housing pivotally mounted adjacent to the exposure opening and movable over the closure opening, exposing a film in taking a picture, an unexposed film strip compartment and an exposed film strip compartment forming a part of the film strip adapter, feeding rolls mounted within the adapter for feeding exposed film strips into the exposed film strip compartment, said exposed film strip compartment being removable, whereby exposed film strips may be removed and developed independently of the remaining unexposed film strips in the unexposed film strip compartment, and a dark curtain movable in front of the compartment containing unexposed film strips, shielding the unexposed strips against light, as the exposed film strips are being removed.

4. A camera having an exposure opening, a film strip adapter including a housing pivotally mounted for positioning over the exposure opening exposing a film in taking a picture, an unexposed film strip magazine in the housing, an exposed film strip magazine within the housing, feeding rolls for transferring exposed film strips to the exposed film strip magazines, a pair of vertically movable bars mounted within the camera at each side thereof, a rod connecting the bars, an ejector plate connected with the rod and being movable into engagement with a film moving the film into engagement with the feed rolls, teeth formed along the edges of one of said bars, a gear rotated with the feed roll meshing with the teeth of one of the movable bars moving the bars in one direction, and springs adapted to return the bars and ejector plate to their normal positions for engagement with another film, upon disengagement of the gears and teeth.

CHARLES P. HOOD.

REFERENCES CITED

The following references are of record in the file of this patent:

UNITED STATES PATENTS

| Number | Name | Date |
| --- | --- | --- |
| 458,907 | Kipper | Sept. 1, 1891 |
| 458,979 | Perry | Sept. 1, 1891 |
| 458,981 | Perry | Sept. 1, 1891 |
| 462,116 | Ellis | Oct. 27, 1891 |
| 1,973,542 | Shull | Sept. 11, 1934 |